US012611635B2

(12) United States Patent
Starostine et al.

(10) Patent No.: US 12,611,635 B2
(45) Date of Patent: Apr. 28, 2026

(54) GAS SEPARATION MEMBRANES

(71) Applicants: Fujifilm Manufacturing Europe B.V., Tilburg (NL); Fujifilm Corporation, Tokyo (JP)

(72) Inventors: Serguei Alexandrovich Starostine, Tilburg (NL); Erik Antonius Maria Vermeer, Tilburg (NL); Yujiro Itami, Tilburg (NL)

(73) Assignees: Fujifilm Manufacturing Europe B.V., Tilburg (NL); Fujifilm Corporation, Tokyo (JP)

( * ) Notice: Subject to any disclaimer, the term of this patent is extended or adjusted under 35 U.S.C. 154(b) by 350 days.

(21) Appl. No.: 18/564,920

(22) PCT Filed: Jun. 14, 2022

(86) PCT No.: PCT/EP2022/066171

§ 371 (c)(1),
(2) Date: Nov. 28, 2023

(87) PCT Pub. No.: WO2023/274718

PCT Pub. Date: Jan. 5, 2023

(65) Prior Publication Data

US 2024/0269620 A1 Aug. 15, 2024

(30) Foreign Application Priority Data

Jun. 29, 2021 (GB) ..................................... 2109309

(51) Int. Cl.
*B01D 53/22* (2006.01)
*B01D 67/00* (2006.01)
(Continued)

(52) U.S. Cl.
CPC ........... *B01D 71/70* (2013.01); *B01D 53/228* (2013.01); *B01D 67/0006* (2013.01);
(Continued)

(58) Field of Classification Search
CPC ......................... B01D 71/70; B01D 67/00791; B01D 53/228; B01D 67/0006; B01D 69/105;
(Continued)

(56) References Cited

U.S. PATENT DOCUMENTS 10,335,733 B2 * 7/2019 Bocciardo ............ B01D 71/643
2003/0222015 A1 12/2003 Oyama et al.
(Continued)

FOREIGN PATENT DOCUMENTS

CN 111948700 A * 11/2020 ............... G01T 1/36
EP 3115098 A1 1/2017
(Continued)

*Primary Examiner* — Anthony Shumate
(74) *Attorney, Agent, or Firm* — Banner & Witcoff, Ltd.

(57) ABSTRACT

A gas separation membrane comprising the following layers: (i) a support layer; (ii) a buffer layer; (iii) a discriminating layer; (iv) optionally a fluorinated polymer layer; and (v) optionally a protective layer; wherein: (a) the buffer layer (ii) and the discriminating layer (iii) each independently comprise groups of Formula (1): M-(O—)$_x$ Formula (1) wherein: each M independently is a metal or metalloid atom; O is an oxygen atom; and each x independently has a value of at least 4; (b) the buffer layer (ii) comprises a surface comprising 4 to 10 atomic % of M of Formula (1) groups, wherein M is as hereinbefore defined; (c) the discriminating layer (iii) comprises a surface comprising more than 10 atomic % of M of Formula (1) groups, wherein M is as hereinbefore defined; and (d) layer (ii) is located between layers (i) and (iii).

10 Claims, 3 Drawing Sheets

(51) Int. Cl.

| | |
|---|---|
| ***B01D 69/10*** | (2006.01) |
| ***B01D 69/12*** | (2006.01) |
| ***B01D 71/70*** | (2006.01) |
| ***C08L 83/04*** | (2006.01) |

(52) U.S. Cl.
CPC ..... *B01D 67/00791* (2022.08); *B01D 69/105* (2013.01); *B01D 69/12* (2013.01); *B01D 69/127* (2013.01); *C08L 83/04* (2013.01); *B01D 2256/245* (2013.01); *B01D 2257/504* (2013.01); *B01D 2323/12* (2013.01)

(58) Field of Classification Search
CPC .............................. B01D 69/12; B01D 69/127; B01D 2256/245; B01D 2257/504; B01D 2323/12; C08L 83/04
See application file for complete search history.

(56) References Cited

U.S. PATENT DOCUMENTS

| | | | | |
|---|---|---|---|---|
| 2009/0246114 | A1* | 10/2009 | Sah | C08G 77/58 585/818 |
| 2014/0138802 | A1* | 5/2014 | Starostine | C23C 16/56 438/786 |
| 2014/0242365 | A1* | 8/2014 | De Vries | C23C 16/545 427/579 |
| 2015/0184300 | A1* | 7/2015 | Starostine | H01J 37/32825 428/312.2 |
| 2017/0025658 | A1* | 1/2017 | Shi | H01M 50/449 |
| 2017/0350006 | A1* | 12/2017 | Bouwstra | H01J 37/32825 |
| 2019/0060835 | A1* | 2/2019 | Ding | B01D 53/002 |
| 2019/0091635 | A1 | 3/2019 | Mukai et al. | |
| 2020/0136176 | A1* | 4/2020 | Chen | H01M 4/382 |
| 2020/0282363 | A1* | 9/2020 | Harrigan | B01D 67/0011 |
| 2022/0274066 | A1* | 9/2022 | Van Der Pluijm | B01D 63/103 |
| 2023/0408904 | A1* | 12/2023 | Lee | C23C 16/45542 |
| 2025/0205653 | A1* | 6/2025 | Starostine | B01D 69/1216 |
| 2025/0205654 | A1* | 6/2025 | Starostine | B01D 71/70 |

FOREIGN PATENT DOCUMENTS

| | | | | | |
|---|---|---|---|---|---|
| JP | H04367222 | A | * | 12/1992 | |
| WO | 2010008283 | A1 | | 1/2010 | |
| WO | 2015046141 | A1 | | 4/2015 | |
| WO | WO-2015049502 | A1 | * | 4/2015 | B01D 71/641 |
| WO | 2019020970 | A1 | | 1/2019 | |

* cited by examiner

CONVENTIONAL
Fig 2
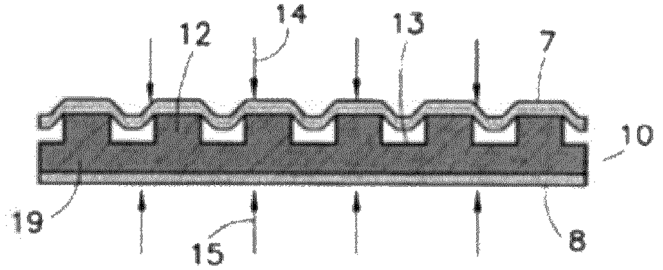
CONVENTIONAL

CONVENTIONAL

GAS SEPARATION MEMBRANES

RELATED APPLICATIONS

This application is a National Stage Application under 35 U.S.C. 371 of co-pending PCT application PCT/EP2022/0066171 designating the United States and filed Jun. 14, 2022; which claims the benefit of GB application number 2109309.1 and filed Jun. 29, 2021, each of which are hereby incorporated by reference in their entireties.

This invention relates to gas separation membranes (GSMs) and to their preparation and use.

U.S. Pat. No. 10,427,111 describes GSMs having high selectivity under high feeding pressure. The GSMs comprise a siloxane layer having a specified O/Si ratio at a certain depth. However U.S. Pat. No. 10,427,111 is silent about the ability of the membranes described therein to resist deformation under pressure.

One of the problems with currently available GSMs and modules containing them is that when they are used to separate polar gases from non-polar gases, their selectivity drops significantly over time. This problem is particularly acute when gas mixtures comprising polar and non-polar gases contact the GSMs under high feeding pressures and temperatures. Under these circumstances the GSMs often deform as a result of normal (a problem often called 'imprint) and/or tangential/shear stress. The problem is particularly acute when a GSM is in contact with a macroporous spacer or carrier element which can both, normally 'imprint' its pattern onto the GSM and deform or scratch the GSM by a tangential/longitudinal/shear dislocation/elongation. As a consequence the selectivity and/or gas separation efficiency of the GSM can be reduced. There is a need for GSMs and modules containing them whose selectivity is maintained, or declines only slowly, when exposed to feed gas mixtures at high pressures and/or high temperatures.

According to a first aspect of the present invention there is provided a gas separation membrane comprising the following layers:

(i) a support layer;
(ii) a buffer layer;
(iii) a discriminating layer;
(iv) optionally a fluorinated polymer layer; and
(v) optionally a protective layer;

wherein:

(a) the buffer layer (ii) and the discriminating layer (iii) each independently comprise groups of Formula (1):

$$M\text{-}(O\text{-})_x \qquad \text{Formula (1)}$$

wherein:

each M independently is a metal or metalloid atom;
O is an oxygen atom; and
each x independently has a value of at least 4;

(b) the buffer layer (ii) comprises a surface comprising 4 to 10 atomic % of M of Formula (1) groups, wherein M is as hereinbefore defined;
(c) the discriminating layer (iii) comprises a surface comprising more than 10 atomic % of M of Formula (1) groups, wherein M is as hereinbefore defined; and
(d) layer (ii) is located between layers (i) and (iii).

In this specification, the term "comprising" is to be interpreted as requiring the presence of the stated parts, steps or components, but does not exclude the presence of one or more additional parts, steps or components. Reference to an item by the indefinite article "a" or "an" does not exclude the possibility that more than one of the item(s) is present, unless the context clearly requires that there be one and only one of the items. The indefinite article "a" or "an" thus usually means "at least one". The buffer layer (ii) is often abbreviated to "BL" and the discriminating layer (iii) is often abbreviated to "DL".

In the present specification, the separation or discriminating layer indicates a layer having a separation selectivity. A layer having a separation selectivity indicates a layer in which a ratio ($P_{CO2}/P_{CH4}$) of a permeability coefficient ($P_{CO2}$) of carbon dioxide to a permeability coefficient ($P_{CH4}$) of methane, in a case where a membrane having a thickness of 0.05 to 30 μm is formed and pure gas of carbon dioxide ($CO_2$) and methane ($CH_4$) is supplied to the obtained membrane at a temperature of 40° C. by setting the total pressure of the gas supply side to 0.5 MPa, is 10 or greater.

BRIEF DESCRIPTION OF THE DRAWINGS

In the accompanying drawings:

FIG. 2 is a schematic vertical sectional view of the conventional gas separation element first illustrated in FIG. 1, in use, and shows vertical deformation of the membrane wall caused at a high gas pressure.

In FIG. 1 there is shown part of a conventional gas separation element used in a conventional gas separation module. In FIG. 1, the conventional gas separation element (10) comprises a first gas separation membrane (7), a second gas separation membrane (8) and a macroporous sheet (19) provided between these gas separation membranes. The macroporous sheet (19) has projections (12) and depressions (grooves) (13) formed alternately at constant intervals on the upper surface. The grooves form main channels for flow of permeate gas.

FIG. 2 is a schematic vertical sectional view showing the vertical (or 'normal') deformation (imprint) of the gas separation membrane (7) caused at a high pressure in the conventional gas separation element (10) shown in FIG. 1. In FIG. 2, the feed gas flows above the first gas separation membrane (7) and below the second gas separation membrane (8), and partially permeates the gas separation membranes (7) and (8) to reach the macroporous sheet (19). In this case, if the feed gas is supplied at a high pressure, the first gas separation membrane (7) located on the rough side of the macroporous sheet (19) is partially depressed into the grooves (13), and is deformed/imprinted. The pressure acting on the first gas separation membrane (7) is indicated by arrows (14), and the pressure acting on the second gas separation membrane (8), by arrows (15). The deformation of the first gas separation membrane (7) partially closes the grooves (13) which are main pathway for the flow of gas which has permeated through the membrane (7). Furthermore, the vertical deformation (imprint) damages the first gas separation membrane (7), thereby lowering the performance of the gas separation membrane (7) such as lowering the membrane's separation selectivity especially the separation of polar and non-polar gases (e.g. separation of higher alkanes such as $C_4H_{10}$ from $CO_2$ from mixtures containing both gases.

FIG. 3 shows is a schematic vertical sectional view of the conventional gas separation element (10) first illustrated in FIG. 1, in use, and shows both vertical (or 'normal') and longitudinal (side-ways) deformation of the gas separation membrane (7). The longitudinal deformation has been caused by longitudinal stress, shear stress and scratching of the gas separation membrane (7). During assembly of a gas separation module and operation the macroporous sheet (19) may shift (16) relative to the gas separation membranes (7) and (8). Due to the friction between gas separation membranes (7) and (8) and macroporous sheet (19) the shift of the macroporous sheet (19) has resulted in longitudinal deformation of gas separation membrane (7), in addition to the vertical deformation caused by high gas pressures in use.

FIG. 4 was obtained by analysing the gas separation membrane from Example 1 of the present invention using ULVAC-PHI surface analysis equipment. The horizontal axis indicates the Argon Gas cluster ion beam (Ar-GCIB) sputter time (indicating the depth being analysed) and the vertical axis indicates the atomic % of each element detected at that depth. In order from top to bottom on the right side of FIG. 4, the 5 lines on the graph in FIG. 4 show the atomic % of carbon, oxygen, total silicon, silicon present in groups of Formula (2) and silicon present in groups of Formula (1) respectively. One can see from the left hand side of FIG. 4 that the atomic % of Si of Si—(O—)$_4$ groups (i.e. of Formula (1)) of a surface of the DL is above 10%. Furthermore, the atomic % of Si of Si—(O—)$_4$ groups in the DL declines with increasing distance from that surface and this decline slows significantly after the DL meets the BL. Typically the surface until the first 15 nm downward in the DL (etching time 0 to about 2 minutes) show significantly high number atomic % of Si of Si—(O—)$_4$ groups (above 15%) which shows high number of built-in of Si(O)$_4$-groups in a relatively thin portion of DL resulting in both high selectivity but also acceptable high permeance for gas separation for the membrane. Typically the atomic % of M of Formula (1) groups for the surface of the DL not in contact with the BL is above 10 atomic % and the surface of the DL which is in contact with the BL typically has an atomic % of M of Formula (1) groups in the range 4 to 10 atomic %. Typically, in the DL, the atomic % of M of Formula (1) groups gradually decreases as the distance from the BL decreases. In contrast, the atomic % of Si of Si—(O—)$_4$ groups is substantially constant throughout the depth of the BL and has a value within the range 4 and 10% (both at its surface and throughout most or all of its depth). By building in the BL composition with a substantially constant atomic % of Si of Si—(O—)$_4$ groups between 4 and 10% below the DL, the BL can be considered not to act as separation or discriminating layer as not enough Si—(O—)$_4$ groups are present but however as a result the layer has enough Si—(O—)$_4$ groups to act as buffer or relaxation layer for improving scratch and imprint performance related to the brittle high Si—(O)$_4$ portion inside the DL as observed to examples prepared without BL.

Figure 1:
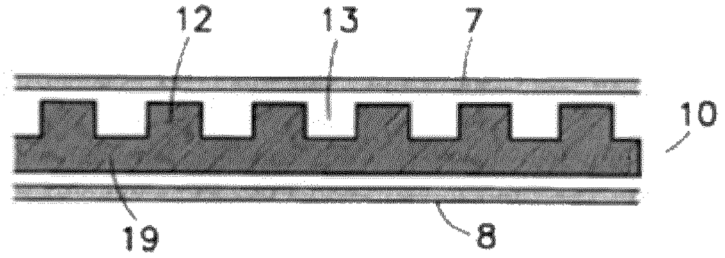
FIG. 1 is a schematic vertical sectional view showing part of a conventional gas separation element comprising outer gas separation membranes and an inner, profiled macroporous sheet.
Figure 3:
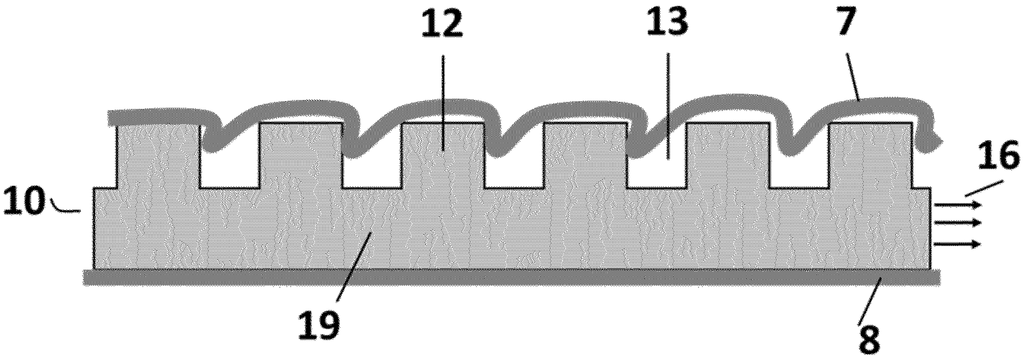
FIG. 3 is a schematic vertical sectional view of the conventional gas separation element first illustrated in FIG. 1 in use and shows both vertical (or 'normal') and longitudinal deformation of the membrane wall. The longitudinal deformation has been caused by longitudinal stress, shear stress and scratching of the membrane.

Preferably layer (i) comprises a porous sheet material ("PSM"). The PSM provides the GSM with mechanical strength and reduces the likelihood of the GSM being damaged when used at high pressures and/or temperatures.

Preferred porous support sheet materials include, for example, woven and non-woven fabrics and combinations thereof.

The PSM may be constructed from, for example, any suitable polymer or natural fibre. Examples of such polymers include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

Many suitable PSMs are commercially available. Alternatively one may prepare the PSM using techniques generally known in the art for the preparation of such materials. In one embodiment one may prepare the optional PSM by curing curable components, e.g. in an analogous manner to that used to prepare membranes which have pores too large to discriminate between different gases. Optionally the PSM may be subjected to a corona discharge treatment, glow discharge treatment, flame treatment, ultraviolet light irradiation treatment or the like, e.g. for the purpose of improving its wettability and/or adhesiveness.

As PSM one may use, for example, an ultrafiltration membrane, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane. Asymmetric ultrafiltration membranes may also be used, including those comprising a porous polymer membrane (preferably of thickness 10 to 150 μm, more preferably 20 to 100 μm) and optionally a woven or non-woven fabric support.

The PSM is preferably as thin as possible, provided that it provides the desired structural strength to the GSM.

Preferably the PSM comprises pores having an average diameter of 0.001 to 10 μm, preferably 0.01 to 1 μm (i.e. before the PSM has been converted into a gas separation membrane). Preferably the PSM comprises pores which, at the surface have an average diameter of 0.001 to 0.1 μm, preferably 0.005 to 0.05 μm. The average pore diameter may be determined by, for example, viewing the surface of the PSM by scanning electron microscopy ("SEM") or by cutting through the PSM and measuring the diameter of the pores within the porous support, again by SEM, then calculating the average.

The porosity at the surface of the PSM may also be expressed as a % porosity i.e.

$$\%\ \text{porosity} = 100\% \times \frac{(\text{area of the surface which is missing due to pores})}{(\text{total surface area})}$$

The areas required for the above calculation may be determined by inspecting the surface of the PSM by SEM before it has been converted into a gas separation membrane. Thus, in a preferred embodiment, the PSM has a % porosity >1%, more preferably >3%, especially >10%, more especially >20%.

Alternatively the porosity of the PSM may be characterised by measuring the $N_2$ gas flow rate through the PSM. Gas flow rate can be determined by any suitable technique, for example using a Porolux™ 1000 device, available from Porometer.com. Typically the Porolux™ 1000 is set at the maximum pressure (about 34 bar) and one measures the flow rate (L/min) of $N_2$ gas through the PSM under test. The $N_2$ flow rate through the PSM at a pressure of about 34 bar for an effective sample area of 2.69 $cm^2$ (effective diameter of 18.5 mm) is preferably >1 L/min, more preferably >5 L/min, especially >10 L/min, more especially >25 L/min. The higher of these flow rates are preferred because this reduces the likelihood of the gas flux of the resultant membrane being reduced by the PSM. The above pore sizes and porosities refer to the PSM before it has been converted into the GSM of the present invention.

The porosity of layer (i) (as a whole) may be expressed as a $CO_2$ gas permeance (units are $m^3(STP)/m^2 \cdot s \cdot kPa$). When the GSM is intended for use in gas separation then layer (i) preferably has a $CO_2$ gas permeance of 5 to $150 \times 10^{-5}$ $m^3(STP)/m^2 \cdot s \cdot kPa$, more preferably of 5 to 100, most preferably of 7 to $70 \times 10^{-5}$ $m^3(STP)/m^2 \cdot s \cdot kPa$.

Layer (i) (as a whole) preferably has an average thickness of 20 to 500 μm, preferably 50 to 400 μm, especially 100 to 300 μm.

Preferably layer (i) further comprises a gutter layer ("GL"). When layer (i) comprises a gutter layer, the gutter layer is preferably located between the PSM and layer (ii).

The total atomic % of M present in a surface of the DL and the BL may include M from other sources. and not just from the groups of Formula (1). For example, the total atomic % of M present in a surface of the DL and the BL includes M from other sources, e.g. from one or more groups of Formula (2):

$$M\text{-}(O\text{-})_z \qquad \text{Formula (2)}$$

wherein:

M is a metal or metalloid atom;

O is an oxygen atom; and

Z has a value of 1, 2 or 3.

Typically the amount of Formula (2) groups does not add in a selectivity change and/or a permeance change inside BL or DL.

Typically the DL and the BL each independently comprise groups of Formula (1) and groups of Formula (2). Preferably, however, the DL comprises a surface comprising a greater mass of Formula (1) groups than of Formula (2) groups.

In a preferred embodiment the total atomic % of Formula (1) groups of the DL is on average above 10% in order to become for selective for gas separation.

In an even more preferred embodiment the total atomic of M of Formula (1) groups of the DL is ranging between 30 and 11% and in the range of thickness between the surface of the DL and 20 nm depth (in direction of the BL) in order to become both selective but also to have enough permeance (permeable) for gas separation.

When the DL or the BL contains Formula (2) groups, preferably M in the Formula (1) groups is the same metal or metalloid atom as M in the Formula (2) groups in that layer. However the M in the DL may be the same as or different to the M in the BL.

Preferably each M independently is silicon, titanium, zirconium or aluminium. Each M independently is preferably silicon, titanium, zirconium and/or aluminium.

Preferably a surface of the DL comprises more than 10 atomic % and less than 50 atomic % of M of Formula (1) groups, especially 12 to 30 atomic % and more especially 13 to 27 atomic % of M of Formula (1) groups, wherein M is as hereinbefore defined.

Preferably the surface of the BL comprises 4.5 to 9 atomic %, and more especially 5 to 8 atomic %, of M of Formula (1) groups, wherein M is as hereinbefore defined.

Preferably the surface of the BL comprises 9 to 30.5 atomic % and more especially 20 to 30 atomic % of M of Formula (2) groups, wherein M is as hereinbefore defined.

Preferably the surface of the DL comprises more than 1 atomic % and less than 25 atomic % of M of Formula (2) groups, especially 2 to 20 and more especially 3 to 15 atomic % of M of Formula (2) groups.

Preferably the total atomic % of M present in a surface of the BL (i.e. M from all sources, e.g. from Formula (1) groups+Formula (2) groups) is from 13.5 to 35 atomic %, especially from 15 to 33 atomic % and more especially 16 to 32 atomic %.

Preferably the total atomic % of M present in a surface of the DL (i.e. M from all sources, e.g. from Formula (1) groups+Formula (2) groups) is more than 11 and less than 50 atomic %, especially from 12 to 35 atomic % and more especially 15 to 33 atomic %.

When M is silicon a surface of the DL preferably comprises 10 to 30 atomic % of M of Formula (1) groups, wherein M is silicon.

When M is aluminium a surface of the DL preferably comprises 10 to 40 atomic % of M of Formula (1) groups, wherein M is aluminium.

When M is titanium a surface of the DL preferably comprises 10 to 30 atomic % of M of Formula (1) groups, wherein M is titanium.

When M is zirconium a surface of the DL preferably comprises 10 to 30 atomic % of M of Formula (1) groups, wherein M is zirconium.

Preferably the composition of the BL is substantially constant throughout it's depth. For example, the atomic % of M present in the BL varies by less than 25% (more preferably less than 10%, especially less than 5%) relative to the average atomic % of M in the BL for at least 80% of the depth of the BL. As an example, if the average atomic % of M in the BL is 'X %' then the atomic % of M in the BL is preferably from 0.75× to 1.25× for at least 80% of the depth of the BL (more preferably 0.9× to 1.1×, especially 0.95 to 1.05×).

In contrast, the composition of the DL typically varies substantially with depth. For example, the atomic % of M of Formula (1) groups present in the DL varies by at least 5% of absolute atomic % from one surface of the DL to the other surface of the DL (more preferably from 6% to 35% from one surface of the DL to the other surface of the DL. As an example, if the surface of the DL in contact with the BL has an average atomic % of M of Formula (1) groups of 'Y %' then the surface of the DL not in contact with the BL preferably has an average atomic % of M of Formula (1) groups of 'Y+5'% to 'Y+35'%, (more preferably 'Y+7'% to 'Y+30'%).

Due to presence in the surface of the DL of the atomic % of M of Formula (1) groups above 10% (even more preferred between 11 and 20%), the DL has a structure comprising sufficient M-$(O)_4$-groups to become capable of discriminating between the gases which are desired to be separated (e.g. separating $CO_2$ from $CH_4$). Preferably the discriminating layer (iii) has a selectivity for one of the gases to be separated over another of the gases to be separated of at least 10. For example the DL selectivity of the invention is preferable over 25 for separating $CO_2$ from $CH_4$. In contrast, the BL layer (ii) of the invention preferably has a selectivity for one of the gases to be separated over another of the gases to be separated of far below 10, e.g. less than 8.

The atomic % of M (e.g. derived from Formula (1) groups and from any Formula (2) groups etc.) at the surface of the DL and the BL may be determined using surface analysis equipment, for example by X-ray photoelectron spectroscopy (XPS) (e.g. using GC-IB/XPS Gas cluster ion beam XPS). Such equipment may also be used to determine the atomic % of M at different depths below the surface of the DL, BL and any other layers (e.g. the GL, when present). A suitable piece of equipment for performing surface analysis to determine the atomic % of M in the various layers is the VersaProbe II XPS apparatus from Physical Electronics, Inc. ("ULVAC-PHI"). The ULVAC-PHI is preferably set up with monochromated Al $K_\alpha$ (1486.6 eV, 15 W 25 KV 100 μmφ, raster size 300 μm×300 μm) X-ray source. For charge compensation, low energy electron and Ar ion may be flooded during measurement of the atomic % of M in the various layers. Ar gas cluster beam (5 kV, 20 nA, 2 mm×2 mm) may be used for depth profile analysis. From this analysis, the atomic % of M and any other elements present in the DL and BL (e.g. carbon and oxygen) may be measured. At the data point which has the highest atomic % of M, the atomic % of M in the DL and BL can be determined. This will include M from all sources such as groups of the Formula (1) or Formula (2) as defined above and the amount of M in each of these groups can be quantified separately. For example, when M is silicon, the atomic % of silicon in Si—(O—)$_4$ groups and Si—(O—)$_z$ groups (wherein z is 1, 2 or 3) can be quantified by this method. In the spectrum of Si2p, the bonding energy at 102.6 eV is defined as being a group of Formula (2), whereas the bonding energy of 103.8 eV is defined as being a group of Formula (1), wherein Formula (1) and Formula (2) are as hereinbefore defined. The area ratio of Si2p at 102.6 eV and at 103.8 eV may be converted to an atomic ratio (atomic %) so that the total of the separated peak components area would correspond to the atomic % of Si.

In one embodiment, the DL comprises a surface comprising more than 10 atomic % of M of Formula (1) groups and the atomic % of M of Formula (1) groups present in the DL declines as the distance in the DL from that surface increases, e.g. in a direction towards the BL, optionally to atomic % of M below 10, wherein M is as hereinbefore defined. This can be seen in FIG. 4.

In contrast to the DL, preferably the total atomic % of M of Formula (1) groups present in the BL is substantially uniform throughout most or all of the depth of the BL. For example, the total atomic % of M present in the BL varies by less than 25% relative to the average atomic % of the BL throughout the depth of the BL. In an even more preferred embodiment the total atomic % of M of Formula (1) groups present in the BL varies by less than 10% (for example 8, 7, 6 or 5%) of the BL throughout the depth (or total thickness) of the BL.

In another aspect of the invention the BL preferably comprises a oxygen-carbon (O/C) ratio above 0.7 to 1.7 (when BL is prepared in absence of oxygen), especially an O/C ratio of 0.7 to 1.5 which is substantially constant and uniform too through the most of the depth of the BL. For example when the ratio varies not more than 10% in value throughout the depth or total thickness of the BL. In contrast, the DL preferably comprises (when the DL is prepared in presence of oxygen) a surface with an oxygen-carbon (O/C) ratio of 1.8 to 100, more preferably (O/C) ratio is between 1.8 to 10 which is not substantially constant in value especially at the surface due to the built-in of oxygen which is declining as a gradient going downwards in the DL in the direction towards the BL.

In yet another aspect of the invention the BL preferably comprises an oxygen-silicon (O/total Si) ratio in the range 1.2 to 1.7, especially 1.25 to 1.6. In contrast, the DL preferably comprises a comprises a surface with O/total Si ratio of 1.8 to 2.5.

The O/C ratio and O/total Si ratio may be determined using the analysis equipment described above, for example by X-ray photoelectron spectroscopy (XPS) (e.g. using GC-IB/XPS Gas cluster ion beam XPS) as described above. The O/C and O/total Si ratios are the ratios by atomic % ratios measured via X-ray photoelectron spectroscopy (XPS).

In one embodiment layer (ii) and layer (iii) are obtainable or obtained by a process comprising plasma deposition of M in the form of groups of Formula (1) and optionally also groups of Formula (2) (as hereinbefore defined). A suitable deposition process comprises plasma deposition, especially plasma deposition of compounds comprising M such that a BL and a DL comprising groups of Formula (1) and optionally also groups of Formula (2) (each as hereinbefore defined) are formed. Preferred plasma deposition processes are performed using an atmosphere comprising air, or oxygen, optionally in the presence of precursors The groups of Formula (1), and also groups of Formula (2) when present (as hereinbefore defined and preferred), are present in layer (ii) and layer (iii).

In one embodiment, layer (iii) is applied to layer (ii) by a plasma treatment process using a precursor compound which provides the groups of Formula (1). A carrier gas may be used which in the case of layer (ii) is preferably free-from oxygen (e.g. an inert gas is used (e.g. nitrogen) and/or a noble gass(es) (e.g. argon or helium)) and in the case of layer (iii) preferably the carrier gas comprises oxygen (e.g. $O_2$ alone or in a mixture with inert and/or noble gass(es) (e.g. argon or helium)), for example as described in U.S. Pat. No. 10,427,111, page 40, line 4 to page 41, line 36, which is included herein by reference thereto.

The plasma treatment process for applying layer (ii) to layer (i) is preferably performed at an energy input level in the range of 0.3 to 9.0 $J/cm^2$ (and using low pressure or even at (remote) atmospheric plasma treatment). In case of energy levels below 0.3 $J/cm^2$ no significant layer (ii) can be made and at higher energy levels than 9 $J/cm^2$ the layer may become dense and brittle which may result in negative (not acceptable) scratch and/or imprint performance.

The plasma treatment process for applying layer (iii) to layer (ii) is preferably performed at an energy input level in the range of 0.3 to 20.0 $J/cm^2$ (and using low pressure or even at (remote) atmospheric plasma treatment). In case of energy input levels below 0.3 $J/cm^2$ no significant discriminating layer (iii) is obtained only the wettability of the surface is affected. At higher levels of 9 $J/cm^2$ the layer (iii) may become too dense resulting in very high selectivity but with not acceptable permeance.

The plasma treatment process for applying layer (ii) to layer (i) (or layer (iii) to layer (ii)) is preferably performed using a flow rate of argon in the range of 5 to 500 $cm^3$ (STP)/min, more preferably in a range of 50 to 200 $cm^3$ (STP)/min, and particularly preferably in a range of 80 to 120 $cm^3$(STP)/min. The flow rate of oxygen (or air) in the case of layer (iii) is preferably 10 $cm^3$(STP)/min, preferably in a range of 10 to 100 $cm^3$(STP)/min, more preferably in a range of 15 to 100 $cm^3$(STP)/min, and particularly preferably in a range of 20 to 50 $cm^3$(STP)/min. The low pressure plasma treatment is preferably performed at a gas pressure in the range of 0.6 Pa to 100 Pa, more preferably in a range of 1 to 60 Pa, and particularly preferably in a range of 2 to 40 Pa.

When a silicon-containing precursor compound is used in the plasma treatment process this results in the deposition of a layer (ii) onto layer (i) (or layer (iii) onto layer (ii)) as a silica-like top-surface comprising groups of Formula (1) and usually also groups of Formula (2), both as hereinbefore defined.

The average thickness of layer (ii) is typically in the range of 1 to 1,500 nm, more preferably 5 to 1,000 nm and even more preferably 10 to 500 nm.

In contrast, the average thickness of layer (iii) is typically in the range of 1 to 150 nm, more preferably 5 to 120 and even more preferably 10 to 100 nm.

Figure 4:
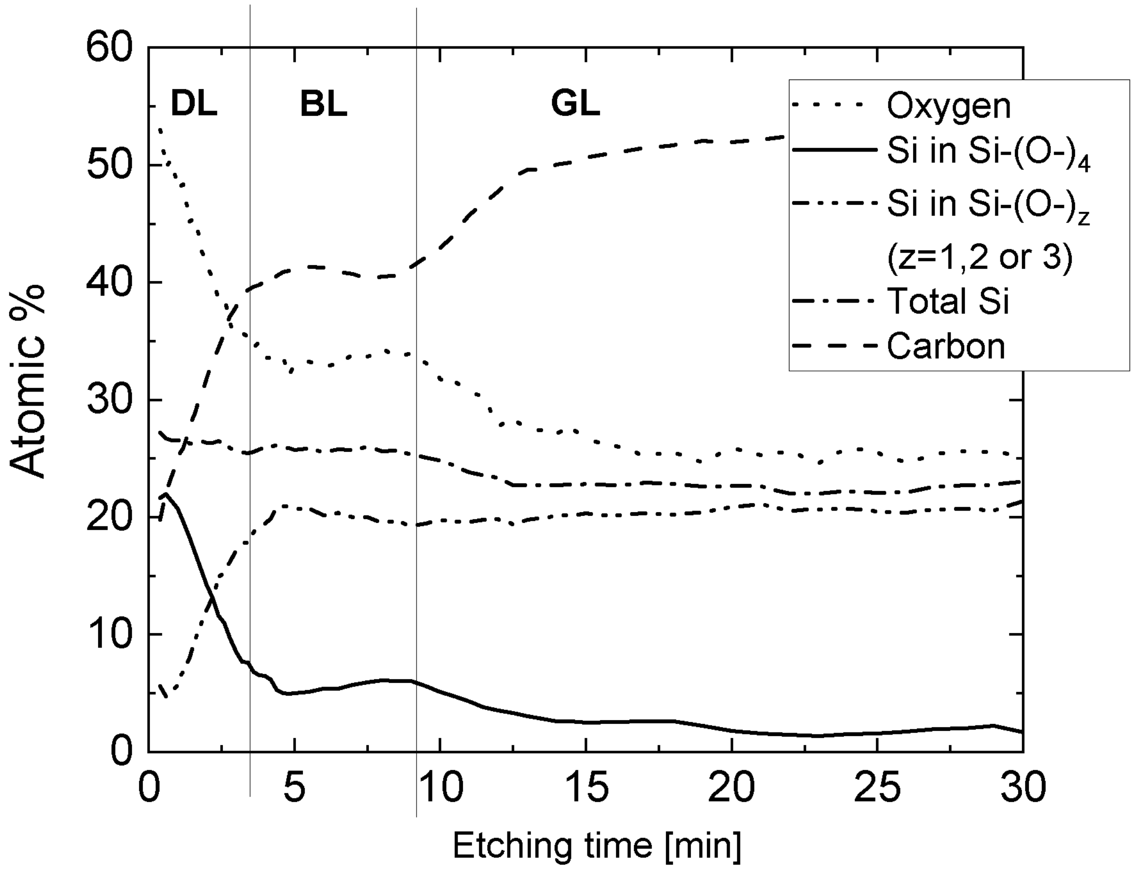
FIG. 4 is graph showing the atomic % of various components in the membrane comprising discriminating layer ("DL"), buffer layer ("BL") and a gutter layer ("GL") which is part of the support layer of the gas separation membrane described in Example 1.

Typically the concentration of groups of Formula (1) in layer (iii) gradually decreases as layer (iii) approaches layer (ii). This can be seen in FIG. 4 where the atomic % of Si—(O—)$_4$ groups is well above 10 at the surface of layer (ii) furthest away from the BL (i.e. low etching time) and reduces as the depth increases (higher etching time) and the proximity to the BL increases. The concentration of the various elements and groups present in membrane at various depths can be accurately measured by using surface analysis equipment, for example by X-ray photoelectron spectroscopy (XPS) as described above. In FIG. 4, the atomic % of Si in Si—(O—)$_4$ groups from Example 1 was found to be above 10% and further it can be seen that a minimum or plateau is reached arriving at the layer (ii) (the BL). Also from FIG. 4 it can be seen that the buffer layer has a relatively constant atomic % of Si—(O—)$_4$ groups throughput its depth of between 4 to 10%.

According to a second aspect of the present invention there is provided a process for forming a gas separation membrane according to the first aspect of the present invention comprising the steps of:

(a) applying layer (ii) to layer (i) by a wet coating process, physical vapor deposition process, chemical vapor deposition process, initiated deposition process or atomic layer deposition process; and (b) applying layer (iii) (the DL) to layer (ii) (the BL) by a plasma deposition or plasma treatment process.

In a preferred embodiment, layer (ii) is applied to layer (i) by a plasma treatment process, e.g. using a plasma treatment device. The preferred plasma treatment process comprises use of an atmospheric pressure glow discharge plasma. For example, layer (i) may be exposed to an atmospheric pressure glow discharge plasma thereby forming layer (ii) thereon.

The plasma treatment process which may be used in step (b) and optionally in step (a) is preferably performed using a plasma treatment apparatus comprising a treatment space and a first electrode and a second electrode in the treatment space for generating an atmospheric pressure glow discharge plasma between the first and second electrode. The electrodes can be provided with a dielectric barrier in various arrangements. In one arrangement the dielectric barrier of at least one electrode is formed by a polymer film or inorganic dielectric. Such as polymer like polyethylene terephthalate (PET), polytetrafluoroethylene (PTFE) or polyethylene (PE) or ceramic such as silica or alumina, or combinations of these, also microporous dielectric materials attached to the electrodes can be used.

In a preferred embodiment, layer (iii) is applied to layer (ii) using atmospheric pressure glow discharge plasma. For example, layer (ii) may be exposed to an atmospheric pressure glow discharge plasma thereby forming layer (iii) thereon.

As mentioned above, preferably the atomic % of M of Formula (1) groups in the BL (ii) is substantially constant throughout the depth of the BL (layer (ii)) whereas the atomic % of M of Formula (1) groups in the DL (layer (iii)) decreases as the distance from the surface of the DL towards the BL (ii) decreases. In order to achieve the substantially constant atomic % of M of Formula (1) groups in the BL, as opposed to the gradient of atomic % of M of Formula (1) groups along the depth of the DL, the manufacturing process for the BL preferably differs from that of the DL in that precursors are used in the presence of noble and inert gasses without presence of oxygen.

In step (a) the plasma treatment process preferably comprises generating an atmospheric pressure glow discharge plasma in a treatment space comprising layer (i) at an effective power density of 0.03 to 30 W/cm$^2$, preferably for less than 120 seconds. Preferably the treatment space is free from oxygen (e.g. the treatment space comprises an oxygen-free inert gas).

In step (b) the plasma treatment process preferably comprises generating an atmospheric pressure glow discharge plasma in a treatment space comprising layer (ii) at an effective power density of 0.1 up to 30 W/cm$^2$, preferably for less than 60 seconds. Preferably in step (b) the treatment space comprises an oxygen-containing atmosphere (e.g. oxygen or air).

Thus it is preferred that step (a) of the process according to the present invention is performed in an atmosphere free from oxygen and step (b) is performed in an atmosphere comprising oxygen.

The atmospheric pressure glow discharge plasma is typically performed using a precursor compound (especially an organosilicon compound). The precursor compound may be included in the treatment space and is preferably performed (in step (a) and in step (b)) at an energy input level of 0.3 to 9.0 J/cm$^2$.

In a preferred embodiment, the treatment space in step (b) comprises an atmosphere of air and an energy input level of 0.3 to 20.0 J/cm$^2$ is used.

In a preferred embodiment, step (a) and/or step (b) comprises stabilization of the atmospheric pressure glow discharge plasma, e.g. according to any of the methods described in, for example, U.S. Pat. No. 6,774,569 and EP1383359.

In a preferred embodiment the process, step (b) comprises exposing layer (ii) to an atmospheric pressure glow discharge plasma, wherein the plasma is stabilized by an inductance and capacitance (LC) matching network, for example as described in EP1917842. This embodiment provides a very rich and thin layer of groups of Formula (1).

In another embodiment, layer (iii) (the DL) may be applied to layer (ii) (the BL) using a plasma treatment in a low pressure plasma environment as described in U.S. Pat. No. 10,427,111.

The plasma treatment apparatus may, in a further embodiment, comprise a transport device for transporting layer (i) (the support layer) or layers (i)+(ii) combined, past the electrode. Also, the transport device may comprise a tensioning mechanism for keeping layer (i) or layers (i)+(ii) in close proximity to the electrode.

In one embodiment layer (ii) (the BL) is obtainable from precursor compounds which may be included in the treatment space. Precursor compounds which may be used to provide groups of Formula (1) (as hereinbefore defined) and optionally groups of Formula (2) (as hereinbefore defined) include TEOS (tetraethyl orthosilicate), HMDSO (hexamethyldisiloxane), TMOS (tetramethyl orthosilicate), TMCTS (1,3,5,7-tetramethylcyclotetrasiloxane), D4 OMCTS (octamethyl cyclotetrasiloxane), D5 (decamethylcyclopentasiloxane), D6 (dodecamethylcyclohexasiloxane), silane ($SiH_4$), bis(triethoxysilyl)ethane (BTESE), TPOT (tetrapropylorthotitanate), TEOT (titanium ethoxide), TTIP (titanium tetraisopropoxide), ZTB (zirconium tetra-tert-butoxide), $Zr(N(C_2H_5)_2)_4$ or $(Cp)Zr(N(CH_3)_2)_3$ or TMA (trimethylaluminium) and mixtures comprising two or more thereof. Other organosilicon or metalorganic monomers providing layer ii with specified properties can be used as well HDMSN (hexamethydisilozane), silane and DVTMDSO (divinyltetramethyldisiloxane).

In one alternative embodiment, step (b) of the process according to the second aspect of the present invention forms layer (iii) (the DL) from precursor compounds, e.g. as described above for the layer (ii) in step (a). Precursor compounds which may be used to provide groups of Formula (1) (as hereinbefore defined) and optionally groups of Formula (2) (as hereinbefore defined) include TEOS (tetraethyl orthosilicate), HMDSO (hexamethyldisiloxane), TMOS (tetramethyl orthosilicate), TMCTS (1,3,5,7-tetramethylcyclotetrasiloxane), D4 OMCTS (octamethyl cyclotetrasiloxane), D5 (decamethylcyclopentasiloxane), D6 (dodecamethylcyclohexasiloxane), silane ($SiH_4$), bis (triethoxysilyl)ethane (BTESE), TPOT (tetrapropylorthotitanate), TEOT (titanium ethoxide), TTIP (titanium tetraisopropoxide), ZTB (zirconium tetra-tert-butoxide), $Zr(N(C_2H_5)_2)_4$ or $(Cp)Zr(N(CH_3)_2)_3$ or TMA (trimethylaluminium) and mixtures comprising two or more thereof.

The groups of Formula (1) (as hereinbefore defined) and optionally groups of Formula (2) (as hereinbefore defined) may be derived from a precursor compound in the presence of $O_2$, e.g. in the form of air. The groups of Formula (1) (as hereinbefore defined) and optionally groups of Formula (2) (as hereinbefore defined) are deposited on layer (i) to form the BL and on layer (ii) to form the DL. By using the atmospheric pressure glow discharge equipment as described in EP1917842 using an inductance and capacitance (LC) matching network a uniform BL (layer ii) can be prepared, preferably of average thickness between 1 and 1,000 nm and with an atomic % of M of $M\text{-}(O—)_x$ (Formula (1) groups) between 4 and 10 (e.g. 4.5 to 9).

Thus in one embodiment of the process according to the second aspect of the present invention, layer (ii) (the BL) and layer (iii) (the DL), each comprising the groups of Formula (1) (and optionally the groups of Formula (2)) may be formed from plasma treatment of layers (i) and (ii) respectively. In another embodiment of the process according to the second aspect of the present invention, layer (ii) (the BL) and layer (iii) (the DL), each comprising the groups of Formula (1) (and optionally the groups of Formula (2)), are each independently formed by deposition onto the layers (i) and (ii) respectively, preferably using a precursor compound.

In another embodiment for the product of the invention the gas separation membrane according the first aspect of the invention is obtainable by a process comprising: 1) depositing a precursor on the porous layer (i) in the absence of oxygen with an energy input level in a range of 0.3 to 9 $J/cm^2$ forming layer (ii); and 2) plasma treating the layer (ii) in the presence of oxygen in an energy input level in a range of 0.3 to 20 $J/cm^2$ thereby forming layer (iii) on top of layer (ii).

As mentioned above, layer (i) preferably comprises a gutter layer ("GL"). The GL, when present, is preferably attached to the PSM.

The GL is permeable to gasses, although typically the GL has a low ability to discriminate between gases. The GL, when present, preferably comprises a polymer resin, especially a polysiloxane.

Preferably the polysiloxane present in or as the GL is a poly(dimethyl)siloxane, e.g. a polymer comprising an $—Si—(CH_3)_2—O—$ repeat unit The GL preferably has an average thickness 50 to 2400 nm, preferably 150 to 800 nm especially 200 to 650 nm.

Preferably the GL comprises groups which are capable of bonding to a metal, for example by covalent bonding, ionic bonding and/or by hydrogen bonding, preferably by covalent bonding. The identity of such groups depends to some extent on the chemical composition of the GL and the identity of the metal, but typically such groups are selected from epoxy groups, oxetane groups, carboxylic acid groups, amino groups, hydroxyl groups, vinyl groups, hydrogen groups and thiol groups. More preferably the GL comprises a polymer having carboxylic acid groups, epoxy groups or oxetane groups, vinyl groups, hydrogen groups, or a combination of two or more of such groups. Such a polymer may be formed on the support by a process comprising the curing of a radiation-curable or heat-curable composition, especially a curable (e.g. radiation-curable) composition comprising a polymerisable dialkylsiloxane. The latter option is useful for providing GLs comprising dialkylsiloxane groups, which are preferred.

The polymerisable dialkylsiloxane is preferably a monomer comprising a dialkylsiloxane group or a polymerisable oligomer or polymer comprising dialkylsiloxane groups. For example, one may prepare the GL from a radiation-curable composition comprising a partially crosslinked, radiation-curable polymer comprising dialkylsiloxane groups, as described in more detail below. Typical dialkylsiloxane groups are of the formula $—\{O—Si(CH_3)_2\}n$- wherein n is at least 1, e.g. 1 to 100. Poly(dialkylsiloxane) compounds having terminal vinyl groups are also available and these may be incorporated into the GL by the curing process.

In one embodiment the GL is free from groups of formula $Si—C_6H_5$.

Irradiation of the radiation-curable composition (sometimes referred to as "curing" in this specification) to form the optional GL may be performed using any source which provides the wavelength and intensity of radiation necessary to cause the radiation-curable composition to polymerise and thereby form the GL on the PSM. For example, electron beam, ultraviolet (UV), visible and/or infrared radiation may be used to irradiate (cure) the radiation-curable composition, with the appropriate radiation being selected to match the components of the composition.

The optional GL is preferably obtained from curing a curable composition comprising:

(1) 0.5 to 25 wt % of radiation-curable component(s), at least one of which comprises dialkylsiloxane groups;

(2) 0 to 5 wt % of a photo-initiator; and (3) 70 to 99.5 wt % of inert solvent.

Preferably the curable composition used to prepare the GL has a molar ratio of metal:silicon of at least 0.0005, more preferably 0.001 to 0.1 and especially 0.003 to 0.03.

The radiation-curable component(s) of component (1) typically comprise at least one radiation-curable group. Radiation curable groups include ethylenically unsaturated groups (e.g. (meth)acrylic groups (e.g. $CH_2═CR^1—C(O)—$ groups), especially (meth)acrylate groups (e.g.

$CH_2$═$CR^1$—C(O)O— groups), (meth)acrylamide groups (e.g. $CH_2$═$CR^1$—C(O)$NR^1$— groups), wherein each $R^1$ independently is H or $CH_3$) and especially oxetane or epoxide groups (e.g. glycidyl and epoxycyclohexyl groups).

The amount of radiation-curable component(s) present in the curable composition used to prepare the GL and/or the optional protective layer (i.e. component (1)) is preferably 1 to 20 wt %, more preferably 2 to 15 wt %. In a preferred embodiment, component (1) of the curable composition used to prepare the GL and/or protective layer comprises a partially crosslinked, radiation-curable polymer comprising dialkylsiloxane groups.

The function of the inert solvent (3) is to provide compositions with a viscosity suitable for the particular method used to apply the curable composition to the support. For high speed application processes one will usually choose an inert solvent of low viscosity. Examples of suitable inert solvents are mentioned above in relation to preparation of the polymer sheet.

The amount of inert solvent (3) present in the curable composition used to prepare the GL and/or protective layer (i.e. component (3)) is preferably 70 to 99.5 wt %, more preferably 80 to 99 wt %, especially 90 to 98 wt %.

Inert solvents are not radiation-curable.

The compositions may contain other components, for example surfactants, surface tension modifiers, viscosity enhancing agents, biocides and/or other components capable of co-polymerisation with the other ingredients.

Layer (iv), when present, is useful for improving the crack-resistance of the gas separation membrane. Layer (iv) may be provided by, for example, the method described in GB2104461.5. Preferably layer (iv), when present, comprises at least two different fluorinated polymers e.g. a perfluorinated polymer which does not comprise silicon and a fluoropolymer which comprises silicon.

Examples of suitable perfluorinated polymers which do not comprise silicon include poly[4,5-difluoro-2,2-bis(trifluoromethyl)-1,3-dioxole-co-tetrafluoroethylene] having 60 to 90 mol % of dioxole, preferably 87 mol % of dioxole (available from Chemous as TEFLON® AF 2400); poly[4,5-difluoro-2,2-bis(trifluoromethyl)-1,3-dioxole-co-tetrafluoroethylene] having 50 to 80 mol % of dioxole, preferably 65 mol % of dioxole (available from Chemous as TEFLON® AF 1600); a perfluorinated polymer from the CYTOP® series (from AGC Chemicals Company), and amorphous poly(tetrafluoroethylene-co-2,2,4-trifluoro-5-trifluoromethoxy-1,3-dioxole), preferably having a proportion of ether functionalities of 30 to 90 mol %, preferably 40, 60 or 80 mol % (available, for example, from Solvay as HYFLON® AD 60 or HYFLON® AD 40H).

Examples of a fluoropolymers which comprise silicon include compounds of Formula (3) below wherein m and n each independently have a value of at least 1 and the compound of Formula (3) has an NAMW average molecular weight of 500 to 10,000 Daltons, especially 550 to 9,000 Daltons and more especially 560 to 8,000 Daltons:

$$(CH_3CH_2O)_3Si\text{-}(CH_2)_3\text{-}NH\text{-}C(O)\text{-}CF_2O\text{-}[\text{-}(CF_2CF_2O)_m\text{-}(CF_2O)_n\text{-}]\text{-}CF_2\text{-}C(O)\text{-}NH\text{-}(CH_2)_3\text{-}Si(OCH_2CH_3)_3 \qquad \text{Formula (3)}$$

Layer (iv), when present, preferably has an average thickness of at least 50 nm. Preferably layer (iv) has an average thickness of 500 nm or less. In a preferred embodiment, layer (iv) has an average thickness of 50 to 500 nm, more preferable from 60 to 400 nm and even more preferably from 70 to 250 nm because this can result in GSMs where layer (iv) does not interfere with the ability of the DL to discriminate between polar and non-polar gases.

Typically layer (iv) is located on layer (iii).

The optional protective layer (v) ("PL") is the outermost layer, e.g. located on layer (iv) (when layer (iv) is present) or on layer (iii) when layer (iv) is not present. The PL may be made of the components described above in relation to the GL and may have the same composition as the GL or a different composition to the GL. The function of the PL is to protect the underlying layer, e.g. layer (iii) or (iv) as the case may be.

Preferably layer (v) (the PL) has an average thickness in the range of 100 to 3,000 nm, more preferably 1,000 and 2,000 nm.

The gas separation membranes of the present invention may be packaged and supplied commercially to companies who assemble gas separation modules, e.g. for their own use or for onward sale.

According to a third aspect of the present invention there is provided a gas separation module comprising one or more gas separation membranes according to the first aspect of the present invention.

The gas separation modules of the present invention preferably further comprise a feed carrier and a permeate carrier, optionally wound onto a perforated tube.

Preferred gas separation modules include a spiral type module, a hollow fiber type module, a pleat type module, a tubular type module, and a plate and frame type module.

According to a fourth aspect of the present invention there is provided use of a gas separation membrane according to the first aspect of the present invention or a gas separation module according to the third aspect of the present invention for separating gases and/or for purifying a feed gas.

The gas separation membranes and modules of the present invention are particularly useful for the separation of a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially NOx, relative to non-polar gases, e.g. alkanes, $H_2$, and $N_2$. Thus the polar gas is preferably $CO_2$, $H_2S$, $NH_3$, $SO_x$, a nitrogen oxides or two or more thereof in combination. The non-polar gas is preferably $N_2$, $H_2$, an alkane or two or more thereof in combination.

Preferably the polar and non-polar gases are gaseous when at 25° C.

The target gas may be, for example, a gas which has value to the user of the module or element and which the user wishes to collect. Alternatively the target gas may be an undesirable gas, e.g. a pollutant or 'greenhouse gas', which the user wishes to separate from a gas stream in order to meet a product specification or to protect the environment.

The modules and membranes of the present invention are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The modules and membranes of the present invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

The modules and membranes of the present invention are particularly useful for separating 'dirty' a feed gas comprising a polar gas, a non-polar gas and a hydrocarbon containing at least two (e.g. 2 to 7) carbon atoms into a permeate gas and a retentate gas, one of which is enriched in the polar gas and the other of which is depleted in the polar gas.

The invention will now be illustrated by the following, non-limiting examples in which all parts and percentages are by weight unless specified otherwise.

EXAMPLES

In these Examples the performance of the gas separation membranes was measured using a multi-layer structure comprising the gas separation under test, 05TH100S sheet and 42369 sheet having the general structure shown Table 1.

05TH100S sheet was from Hirose paper manufacturing (a wet-laid polyester non-woven/average thickness 100 μm/average weight 100 g/m$^2$/average density 0.93 g/cm$^3$). 42369 sheet is a macroporous sheet material from Guilford (a fabric made from polyethylene terephthalate and epoxy resin/average thickness of 0.3 mm/60 wpi (wales per 2.54 cm)/59 cpi (courses per 2.54 cm)). The 05TH100S sheet and the 42369 sheet together acted as imprinting sheet for testing the gas membranes under high pressure feeds and temperatures.

TABLE 1

| Gas Separation Membrane under test |
|---|
| 05TH100S sheet |
| 42369 sheet |

In the Examples, the feed gas used had the composition shown in Table 2 below:

TABLE 2

| | Components | | |
|---|---|---|---|
| Feed gas | $CO_2$ | $CH_4$ | n-$C_4H_{10}$ |
| vol % | 13.00 | 86.00 | 1.00 |

The performance properties of the gas separation membranes of the present invention were measured using the multilayer structure shown in Table 1 by the following techniques:

(A) Permeance:

The feed gas having the composition described in Table 2 above was passed through the multilayer structure shown in Table 1 under test at 40° C. at a gas feed pressure of 6000 kPa. The flux of $CO_2$ and n-$C_4H_{10}$ and $CH_4$ through the simplified gas separation composites was measured using a gas permeation cell with a measurement diameter of 2.0 cm.

The permeance ($Q_i$) of $CO_2$ and n-$C_4H_{10}$ and $CH_4$ was determined after 5 minutes continuous use on gas separation composites using the following equation:

$$Q_i=(\theta_{Perm}\cdot X_{Perm,i})/(A\cdot(P_{Feed}\cdot X_{Feed,I}-P_{Perm}\cdot X_{Perm,i}))$$

wherein:

$Q_i$=Permeance of the relevant gas (i.e. i is $CO_2$ or $C_4H_{10}$ or $CH_4$) (m$^3$(STP)/m$^2$·kPa·s);

$\theta_{Perm}$=Permeate flow rate (m$^3$(STP)/s);

$X_{Perm,i}$=Volume fraction of the relevant gas in the permeate gas;

A=Membrane area (m$^2$);

$P_{Feed}$=Feed gas pressure (kPa);

$X_{Feed,i}$=Volume fraction of the relevant gas in the feed gas;

$P_{Perm}$=Permeate gas pressure (kPa); and

STP is standard temperature and pressure, which is defined here as 25.0° C. and 1 atmosphere pressure (101.325 kPa).

The ($Q_i$) can be determined by 1 GPU=1×10$^{-6}$ cm$^3$(STP)/(s·cm$^2$·cmHg).

The permeance of $CO_2$ above 25 GPU was evaluated as acceptable and below or equal to 25 GPU was deemed to be unacceptable.

(B) Selectivity

The selectivity ($CO_2/C_4H_{10}$ and $CO_2/CH_4$; $\alpha CO_2/C_4H_{10}$ and $\alpha CO_2/CH_4$) of each gas separation composite under test for the gas mixture described in Table 2 was calculated from $QCO_2$ and $Qn\text{-}C_4H_{10}$ calculated as described above based on following equations:

$$\alpha CO_2/n\text{-}C_4H_{10}=QCO_2/Qn\text{-}C_4H_{10};$$

$$\alpha CO_2/CH_4=QCO_2/QCH_4$$

wherein $QCO_2$, $QCH_4$ and $Qn\text{-}C_4H_{10}$ were determined by the method described in step (A) above.

An $\alpha CO_2$/n-$C_4H_{10}$ value of 100 or higher was deemed to be acceptable and an $\alpha CO_2$/n-$C_4H_{10}$ value of below 100 was deemed to be unacceptable.

An $\alpha CO_2/CH_4$ value of 26 or higher was deemed to be acceptable and an $\alpha CO_2/CH_4$ value of below 26 was deemed to be unacceptable.

(C) Imprint Performance Test

Imprint performance was determined as follows:

The gas separation membranes were placed on other layers as shown in Table 1 above to give a stack of sheets. Each sheet was circular and had a diameter of 48 mm:

The stack of sheets was placed into a cell and a gas mixture comprising $O_2$ and $N_2$ was applied to the membrane side at a pressure of 100 bar for 30 minutes at 60° C. The pressure was then reduced to atmospheric pressure and again pressurized and pressurized under same conditions for in total 5 cycles and the gas separation membrane under test was removed from the set of sheets to give an imprinted membrane. The imprint performance, i.e. the extent to which the sheets had imprinted its texture onto the gas separation membrane, was then evaluated by repeating the flux (A) and selectivity (B) tests described above on the (5 times) imprinted membrane for the same gas separations and evaluation.

(D) Scratch (Shear Stress) Test

The extent to which performance of the gas separation membranes was affected by being scratched was determined as follows:

The gas separation membrane under test was placed in Heidon Type 14DR apparatus for surface property tests. The measurement head (diameter 8 mm, width 10 mm) was covered with macroporous 42369 sheet from Guilford (a fabric made from polyethylene terephthalate and epoxy resin/average thickness of 0.3 mm/60 wpi (wales per 2.54 cm)/59 cpi (courses per 2.54 cm)) and the head was put on the membrane with a weight of 300 g. The head with spacer and weight was moved over the membrane surface for 80 times in order to simulate the scratch and shear stress on the membrane under test.

The scratch performance, i.e. the extent to which the performance of the membranes was affected by scratching, was then evaluated by performing the flux (A) and selectivity (B) tests before and after the above scratching and then comparing the results.

Preparation of the Gas Separation Membranes

The following materials were used to prepare the gas separation membranes:

PAN1 is a porous sheet material having an average thickness of 170-180 μm comprising a PET nonwoven support (140-150 μm thick) having a porous polyacrylonitrile layer. PAN1 was obtained from Microdyn-Nadir GmbH, Germany, under the trade name UA100T and comprised 3.5 mg/m$^2$ of Na$^+$ (sodium ions).

PAN2 is a porous sheet material having an average thickness of 180-190 μm comprising a PET nonwoven support (140-150 μm thick) having a porous polyacrylonitrile layer. PAN2 was obtained from GMT Membrantechnik GmbH, Germany under the trade name L14.

X-22-162C is a dual end reactive silicone having carboxylic acid reactive groups, a viscosity of 220 mm$^2$/s and a reactive group equivalent weight of 2,300 g/mol, from Shin-Etsu Chemical Co., Ltd. (MWT 4,600) (I is an integer).

X-22-162c

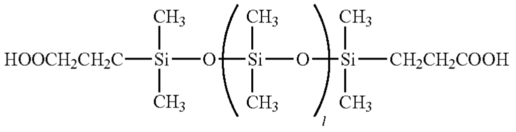

DBU is 1,8-diazabicyclo[5.4.0]undec-7-ene from Sigma Aldrich.

UV-9300 is SilForce™ UV-9300 from Momentive Performance Materials Holdings having an epoxy equivalent weight of 950 g/mole oxirane (MWT 9,000, determined by viscometry)) (m and n are integers).

UV-9300

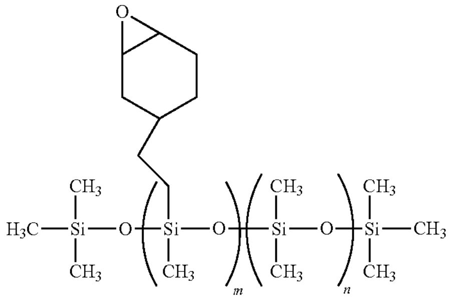

CAS: 67762-95-2

HYFLON™ AD 60 is amorphous poly(tetrafluoroethylene-co-2,2,4-trifluoro-5-trifluoromethoxy-1,3-dioxole), preferably having a proportion of ether functionalities of 30 to 90 mol %, preferably 60 mol %, available, for example, from Solvay (this is a perfluorinated fluoropolymer which does not comprise silicon).

D4484 is 1,1,1,2,2,3,4,5,5,5-Decafluoro-3-methoxy-4-(trifluoromethyl)pentane from Tokyo Chemical Industry (a solvent).

I0591 is 4-isopropyl-4'-methyldiphenyliodoniumtetrakis (pentafluorophenyl) borate ($C_{40}H_{18}BF_{20}I$) from Tokyo Chemical Industries N.V. (Belgium)

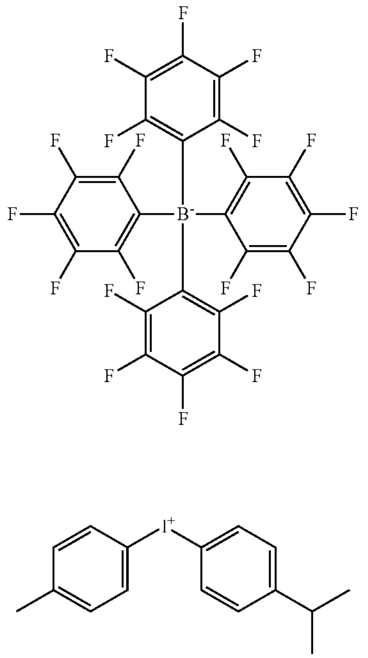

$Ti(OiPr)_4$ is titanium (IV) isopropoxide from Dorf Ketal Chemicals (MWT 284).

n-Heptane is n-heptane from Brenntag Nederland BV.

MEK is 2-butanone from Brenntag Nederland BV.

QM1 is VQM-146, a vinyl functional QM resin dispersion in a dual end vinyl functional polydimethylsiloxane from Gelest Inc. having the following formula:

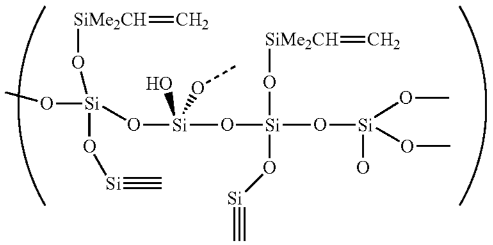

MIBOH is 2-methyl-3-butyn-2-ol from Sigma-Aldrich.

HMS-301 is a poly(methylhydrosiloxane-co-dimethylsiloxane) from Gelest Inc.

PT is SIP6831.2, a platinum(0)-1,3-divinyl-1,1,3,3-tetramethyldisiloxane complex in Xylene from Gelest Inc.

Si-1 is a fluoropolymer which comprise silicon and is of Formula (3) shown above with an average molecular weight of 1,750 to 1.950 Daltons (from Solvay).

TTIP is titanium tetraisopropoxide (97%) supplied by Merck which is used a precursor for the buffer layer (ii).

HMDSO is hexamethyl disiloxane (98%) supplied by Merck which is used a precursor for the buffer layer (ii).

TMCTS is 1,3,5,7-tetramethylcyclotetrasiloxane (>98.5%) supplied by Merck which is used a precursor for the buffer layer (ii).

05TH100S is a sheet material from Hirose paper manufacturing (a wet-laid polyester non-woven/average thickness 100 μm/average weight 100 $g/m^2$/average density 0.93 $g/cm^3$).

42369 sheet is a sheet material from Guilford (a fabric made from polyethylene terephthalate and epoxy resin/average thickness of 0.3 mm/60 wpi (wales per 2.54 cm)/59 cpi (courses per 2.54 cm)).

Preparation of Membrane Sheet

Stage a) Preparation of a Partially Cured Polymer ("PCP Polymer")

The components UV-9300, X-22-162C and DBU were dissolved in n-heptane in the amounts indicated in Table 3 and maintained at a temperature of 91° C. for 168 hours. The resultant polymer (PCP Polymer) had a Si content (meq/g polymer) of 12.2 and the resultant solution of PCP Polymer had a viscosity of 125 mPas at 25.0° C.

TABLE 3

Ingredients used to Prepare PCP Polymer

| Ingredient | Amount (w/w %) |
|---|---|
| UV-9300 (w/w %) | 46.395 |
| X-22-162C (w/w %) | 13.596 |
| DBU (w/w %) | 0.009 |
| n-Heptane (w/w %) | 40.000 |

Stage b) Preparation of Radiation Curable Composition C

The solution of PCP Polymer arising from the Stage a) was cooled to 20° C. and diluted using n-heptane to give the PCP Polymer concentration indicated in Table 4 below. The solution was then filtered through a filter paper having a pore size of 2.7 μm. The photoinitiator (I0591) and a metal complex ($Ti(OiPr)_4$) were then added in the amounts (wt/wt %) indicated in Table 4 to give Curable Composition C. The amount of $Ti(OiPr)_4$ present in Curable Composition C corresponded to 55.4 μmol of $Ti(OiPr)_4$ per gram of PCP Polymer. Also the molar ratio of metal:silicon in Curable Composition C was 0.0065.

TABLE 4

Ingredients of Curable Composition C

| Ingredient | Amount (wt/wt %) |
|---|---|
| PCP Polymer | 10.000 |
| I0591 | 0.105 |
| $Ti(OiPr)_4$ | 0.226 |
| DBU | 0.001 |
| MEK | 2.008 |
| n-Heptane | 87.660 |

Curable Composition C was used to prepare the gutter layer ("GL") and the protective layer ("PL") of the gas separation membranes, as described in more detail below.

Stage c) Preparation of a Resin Precursor Composition for Comparative Examples Co-Ex2 and Co-Ex3 (which Lack a Buffer Layer According to the Present Invention)

The components mentioned in Table 5 below were added mixed in the indicated concentrations and stirred for 5 minutes at room temperature to prepare a curable polysiloxane polymer solution. The solution was filtered through a polypropylene filter having a pore size of 0.5 μm before use.

TABLE 5

Ingredients for a resin precursor composition

| Ingredient | Amount (wt/wt %) |
|---|---|
| QM1 | 2.294 |
| HMS-301 | 0.206 |
| PT | 0.0075 |
| MIBOH | 0.0075 |
| n-Heptane | 97.485 |

Stage d) Preparation of Composition used to Form Layer (iv) (the FPL) ("Composition D1")

Hyflon™ AD60 was mixed with a solvent (D4484, 1,1,1,2,2,3,4,5,5,5-decafluoro-3-methoxy-4-(trifluoromethyl) pentane from Tokyo Chemical Industry) in the amounts indicated in Table 6 below. The mixture was stirred at 25° C. for 30 hours in a closed bottle. Then S-1 was added and the mixture was stirred for 1 hr at 20° C. The solution was then filtered through a filter paper having a pore size of 2.7 μm to give Composition D1.

TABLE 6

Preparation of Composition D1

| Ingredient | Ingredient Type | D1 Amount (wt/wt %) |
|---|---|---|
| HYFLON ™ AD 60 | perfluorinated polymer which does not comprise silicon | 0.95 |
| Si-1 | fluoropolymer which comprises silicon | 0.05 |
| D4484 | Solvent | 99 |
| Viscosity (mPas at 25° C.) | | 1-20 |

Composition D1 was used to prepare layer (iv) ("FPL") of the membranes, as described in more detail below.

Step i. Preparation of the Support Layer (i) Comprising a Porous Sheet Material ("PSM") and a Gutter Layer (GL) (PSM-GL)

Curable Composition C was applied to the PAN1 or PAN2 porous sheet material (comprising polyacrylonitrile (PAN)) by a meniscus dip coating at a speed of 10 m/min and the coated porous sheet material was then irradiated at an intensity of 16.8 kW/m (70%) using a Light Hammer LH10 from Fusion UV Systems fitted with a D-bulb. The resultant support layer comprised a porous sheet material and a polysiloxane (PDMS) gutter layer of dry thickness 600 nm. The gutter layer comprised a metal complex and dialkylsiloxane groups. The gutter layer thickness was determined by cutting through the support layer and measuring the thickness from the surface of the porous sheet material outwards by SEM.

Preparation of Comparative Support Layers comprising a Porous Sheet Material (PSM), a Gutter Layer (GL) and a Resin Precursor layer (RPL) on the GL (for Comparative Examples 2 and 3 (PSM+GL+RPL))

The resin precursor composition described in Table 5 above was applied to the GL of the product of step (i) (porous sheet material+GL) (as specified in Table 7 below) using a pre-metered slot-die coating at a speed of 10 m/min and the resulting product was then heated to a temperature of 60° C. for a period of 10 minutes. The resulting product comprised the porous sheet material (PSM)+a gutter layer (GL)+a resin precursor layer (RPL) in that order. This is a Comparative layer because there was used the RPL instead of layer (ii) according to the present invention. The resin precursor layer had a thickness of 150 nm, as determined by cutting through the support layer (i.e. PSM+GL)+RPL composite and measuring the thickness from the surface of the support layer outwards by SEM, the results of which is listed in Table 7 below.

Step iii. Formation of the Buffer Layer (BL)

Samples of the support layer (i) from step i. were each independently exposed to an atmospheric pressure glow discharge (APG) plasma using different precursors (HMDSO, TMCTS and TTIP, as indicated in Table 7 below). The device used for the exposure was as described in EP1917842. The precursor mass flow supplied via controlled evaporation unit was 1.0 g/hr for HMDSO, 0.5 g/hr for TMCTS and 1.0 g/hr for TTIP. The precursor vapours were diluted in argon process carrier gas. The flow of the process gas was 20 $dm^3$ (STP)/min. The applied plasma power density was 0.4 $W/cm^2$ in all cases. The thickness of the resultant buffer layers depended on the precursor and conditions used (the treatment time was between 5 and 15 seconds) and was ascertained for each gas separation membrane by cutting through the PMS(+GL)+BL composite and measuring the thickness using a scanning electron microscope. Energy input level for Examples 1 to 4 is 2.0 $J/cm^2$; for Example 5 and 6 4.0 $J/cm^2$; for Example 7 1.5 $J/cm^2$; for Example 8 the energy input level is 1.6 $J/cm^2$; for Example 9 the energy input level is 4.0 $J/cm^2$ and for Example 10 the energy input level is 6 $J/cm^2$.

Step iv. Formation of the Discriminating Layer (DL) for the Comparative Examples (Porous Support+RPL from Step ii.) and the Examples (Porous Support+BL from Step (iii))

Discriminating layers were formed in the Comparative Examples and Examples by exposing the products of step ii. and step iii. respectively to a further atmospheric glow discharge (APG) plasma treatment in the presence of oxygen ($O_2$). This can be contrasted with preparation of the BL where the APG plasma treatment was performed in the absence of oxygen ($O_2$).

For Examples 1 to 10 and Comparative Examples 1 to 3 the atmospheric plasma device used to form the DL was as described in EP1917842, FIG. 5, with carrier gas conditions of an oxygen flow rate of 0.5 $dm^3$ (STP)/min and an argon flow rate of 20 $dm^3$ (STP)/min were set, and then a plasma treatment was performed as an oxygen atom permeating treatment at an energy input level of 1.75 $J/cm^2$ for Example 1 and 0.9 $J/cm^2$ for all other Examples.

The presence of groups of Formula (1) and the atomic % of M of Formula (1) in the surface was determined for the DL and BL in each Example and Comparative Example as described above and results are listed in Table 7 below.

Step iv. Formation of Fluorinated Polymer Layer ("FPL") in Examples 4 and 6 and Comparative Example 3

In Examples 4 and 6 and Comparative Example 3, FPLs were provided by a meniscus dip coating the membranes in Composition D1 (described above) at a speed of 10 m/min and then drying the resultant gas separation membrane. The thickness of the resultant layer (iv) (FPL) was determined by cutting through the membrane and measuring the thickness from the top-most layer by SEM.

Step v. Formation of Protective Layer ("PL") for Examples 2 to 10 and Comparative Examples 1 to 3.

In Examples 2 to 10 and Comparative Examples 1 to 3 PLs were applied as follows:

In Examples 2 to 10 and Comparative Examples 1 to 3, the PLs were obtained by applying Curable Composition C having the formulation described above to all the stated membranes by a meniscus dip coating at a speed of 10 m/min. The coated membranes were then cured by irradiating at an intensity of 24 kW/m using a Light Hammer LH10 from Fusion UV Systems fitted with a D-bulb. The average thicknesses of each protective layer (v) was 2400 nm, as measured by SEM.

Table 7 shows the composition of each gas separation membrane Example and Comparative Example in more detail.

Table 8 shows the selectivity and permeance of the gas separation membranes arising from the Examples and Comparative Examples before and after imprint.

Table 9 shows the selectivity and permeance of the gas separation membranes arising from the Examples and Comparative Examples before and after the scratch test.

From Tables 8 and 9 it can be seen that imprint and scratching of the gas separation membranes of the present invention impaired their selectivity and permeance much less than for the Comparative Examples.

TABLE 7

| | PSM | GL (thickness) | BL or RPL: Atomic % of M of Formula (1) Groups (thickness) | BL or RPL: precursor | BL or RPL: O/C | O/M (M = Si, Ti) | DL Atomic % of M of Formula (1) Groups (thickness) | FPL Type (thickness) | PL Thickness |
|---|---|---|---|---|---|---|---|---|---|
| Ex. 1 | PAN1 | GL (600 nm) | 5 BL (30 nm) | HMDSO | 0.84 | 1.44 | 22 (40 nm) | — | — |
| Ex. 2 | PAN1 | GL (600 nm) | 5 BL (30 nm) | HMDSO | 0.84 | 1.44 | 12 (30 nm) | — | 2400 nm |

TABLE 7-continued

| | | | BL or RPL | | | | | | |
|---|---|---|---|---|---|---|---|---|---|
| | PSM | GL (thickness) | Atomic % of M of Formula (1) Groups (thickness) | precursor | O/C | O/M (M = Si, Ti) | DL Atomic % of M of Formula (1) Groups (thickness) | FPL Type (thickness) | PL Thickness |
| Ex. 3 | PAN2 | GL (600 nm) | 5 BL (30 nm) | HMDSO | 0.84 | 1.44 | 12 (30 nm) | — | 2400 nm |
| Ex. 4 | PAN1 | GL (600 nm) | 5 BL (30 nm) | HMDSO | 0.84 | 1.44 | 12 (30 nm) | D1 (100 nm) | 2400 nm |
| Ex. 5 | PAN1 | GL (600 nm) | 9 BL (30 nm) | HMDSO | 1.51 | 1.67 | 12 (30 nm) | — | 2400 nm |
| Ex. 6 | PAN1 | GL (600 nm) | 9 BL (30 nm) | HMDSO | 1.51 | 1.67 | 12 (30 nm) | D1 (100 nm) | 2400 nm |
| Ex. 7 | PAN1 | GL (600 nm) | 5 BL (25 nm) | TMCTS | 0.96 | 1.53 | 12 (30 nm) | — | 2400 nm |
| Ex. 8 | PAN1 | GL (600 nm) | 5 BL (50 nm) | TTIP | 0.75 | 1.28 | 12 (30 nm) | — | 2400 nm |
| Ex. 9 | PAN2 | GL (600 nm) | 9 BL (30 nm) | HMDSO | 1.51 | 1.67 | 12 (30 nm) | — | 2400 nm |
| Ex. 10 | PAN2 | — | 5 BL (100 nm) | HMDSO | 0.84 | 1.44 | 12 (30 nm) | — | 2400 nm |
| co-Ex. 1 | PAN1 | GL (600 nm) | — | — | — | — | 12 (30 nm) | — | 2400 nm |
| co-Ex. 2 | PAN1 | GL (600 nm) | 3 RPL (150 nm) | — | 0.63 | 1.18 | 12 (30 nm) | — | 2400 nm |
| co-Ex. 3 | PAN1 | GL (600 nm) | 3 RPL (150 nm) | — | 0.63 | 1.18 | 12 (30 nm) | D1 (100 nm) | 2400 nm |

Note:
Comparative Example 1 to 3 did not comprise layer (ii) according to the present invention; Comparative Examples 2 and 3 contained instead a RPL.

TABLE 8

| | Before imprint | | | After imprint | | |
|---|---|---|---|---|---|---|
| | $CO_2/CH_4$ selectivity OK:>25 | $CO_2$ permeance [GPU] OK:>25 | $CO_2$/n-$C_4H_{10}$ selectivity OK:>100 | $CO_2/CH_4$ selectivity OK:>25 | $CO_2$ permeance [GPU] OK:>25 | $CO_2$/n-$C_4H_{10}$ Selectivity OK:>100 |
| Ex. 1 | 55 | 61 | >100 | 52 | 63 | >100 |
| Ex. 2 | 36 | 103 | >100 | 36 | 97 | >100 |
| Ex. 3 | 35 | 101 | >100 | 34 | 101 | >100 |
| Ex. 4 | 39 | 86 | >100 | 38 | 88 | >100 |
| Ex. 5 | 47 | 77 | >100 | 47 | 78 | >100 |
| Ex. 6 | 51 | 65 | >100 | 50 | 67 | >100 |
| Ex. 7 | 38 | 98 | >100 | 37 | 98 | >100 |
| Ex. 8 | 41 | 85 | >100 | 42 | 84 | >100 |
| Ex. 9 | 45 | 78 | >100 | 45 | 79 | >100 |
| Ex. 2 | 41 | 82 | >100 | 40 | 83 | >100 |
| co-Ex. 1 | 33 | 125 | >100 | 12 (NG) | 351 | <100 (NG) |
| co-Ex. 2 | 37 | 95 | >100 | 22 (NG) | 252 | <100 (NG) |
| co-Ex. 3 | 42 | 83 | >100 | 40 | 85 | >100 |

NG = Not good;

OK = Good

TABLE 9

| | Before scratching | | | After scratching | | |
|---|---|---|---|---|---|---|
| | $CO_2/CH_4$ selectivity OK:>25 | $CO_2$ permeance [GPU] OK:>25 | $CO_2$/n-$C_4H_{10}$ selectivity OK:>100 | $CO_2/CH_4$ selectivity OK:>25 | $CO_2$ permeance [GPU] OK:>25 | $CO_2$/n-$C_4H_{10}$ Selectivity OK:>100 |
| Ex. 1 | 55 | 61 | >100 | 55 | 65 | >100 |
| Ex. 2 | 36 | 103 | >100 | 35 | 97 | >100 |
| Ex. 3 | 35 | 101 | >100 | 33 | 105 | >100 |
| Ex. 4 | 39 | 86 | >100 | 37 | 88 | >100 |
| Ex. 5 | 47 | 77 | >100 | 46 | 78 | >100 |
| Ex. 6 | 51 | 65 | >100 | 49 | 68 | >100 |
| Ex. 7 | 38 | 98 | >100 | 38 | 99 | >100 |
| Ex. 8 | 41 | 85 | >100 | 39 | 87 | >100 |
| Ex. 9 | 45 | 78 | >100 | 42 | 81 | >100 |
| Ex. 10 | 41 | 82 | >100 | 39 | 87 | >100 |
| co-Ex. 1 | 33 | 125 | >100 | 10 (NG) | 371 | <100 (NG) |
| co-Ex. 2 | 37 | 95 | >100 | 15 (NG) | 311 | <100 (NG) |
| co-Ex. 3 | 42 | 83 | >100 | 21 (NG) | 151 | <100 (NG) |

NG = Not good;
OK = Good

The invention claimed is:

1. A gas separation membrane comprising the following layers:

(i) a support layer;

(ii) a non-selective buffer layer formed by plasma treatment using a precursor;

(iii) a discriminating layer;

(iv) optionally a fluorinated polymer layer; and (v) optionally a protective layer;

wherein:

(a) the buffer layer (ii) and the discriminating layer (iii) each independently comprise groups of Formula (1):

$$M\text{-}(O\text{-})_x \qquad \text{Formula (1)}$$

wherein:

each M independently is a metal or metalloid atom;

O is an oxygen atom; and each x independently has a value of at least 4;

(b) the buffer layer (ii) comprises a surface comprising 4 to 10 atomic % of M of Formula (1) groups, wherein M is as hereinbefore defined;

(c) the discriminating layer (iii) comprises a surface comprising more than 10 atomic % of M of Formula (1) groups, wherein M is as hereinbefore defined; and (d) layer (ii) is located between layers (i) and (iii).

2. The gas separation membrane according to claim 1 wherein said discriminating layer is formed by plasma treatment using the following precursor compounds: TEOS (tetraethyl orthosilicate), HMDSO (hexamethyldisiloxane), TMOS (tetramethyl orthosilicate), TMCTS (1,3,5,7-tetramethylcyclotetrasiloxane), D4 OMCTS (octamethyl cyclotetrasiloxane), D5 (decamethylcyclopentasiloxane), D6 (dodecamethylcyclohexasiloxane), silane ($SiH_4$), bis (triethoxysilyl)ethane (BTESE), TPOT (tetrapropylorthotitanate), TEOT (titanium ethoxide), TTIP (titanium tetraisopropoxide), ZTB (zirconium tetra-tert-butoxide), $Zr(N(C_2H_5)_2)_4$, $(Cp)Zr(N(CH_3)_2)_3$ or TMA (trimethylaluminium).

3. The gas separation membrane according to claim 1 wherein said discriminating layer is formed by plasma treatment.

4. The gas separation membrane according to claim 3 wherein the buffer layer (ii) comprises a surface comprising 4.5 to 9 atomic % of M of Formula (1) groups.

5. The gas separation membrane according to claim 1 wherein each M independently is silicon, titanium, zirconium or aluminium.

6. The gas separation membrane according to claim 3 wherein the buffer layer (ii) comprises a oxygen-carbon (O/C) ratio above 0.7 to 1.7.

7. The gas separation membrane according to claim 1 wherein the discriminating layer (iii) comprises a oxygen-silicon (O/total Si) ratio between 1.8 and 100.

8. The gas separation membrane according to claim 1 wherein the atomic % of M in the buffer layer (ii) is substantially constant throughout the depth of the buffer layer (ii) and the atomic % of M in the discriminating layer (iii) decreases as the distance from the buffer layer (ii) decreases.

9. A process for forming a gas separation membrane according to claim 1 which comprises the steps of:

(a) applying layer (ii) to layer (i) by a plasma treatment in an atmosphere free of oxygen; and (b) applying layer (iii) to layer (ii) by a plasma treatment in an atmosphere comprising oxygen.

10. A gas separation module comprising a gas separation membrane according to claim 1.

* * * * *